United States Patent [19]

Lojou

[11] 4,377,933
[45] Mar. 29, 1983

[54] RESERVOIR WITH AN ANTIVIBRATION SUSPENSION

[75] Inventor: Yves J. Lojou, Pringy, France

[73] Assignee: Societe Nationale D'Etude et De Construction De Moteurs D'Aviation, "S.N.E.C.M.A.", Paris, France

[21] Appl. No.: 275,699

[22] Filed: Jun. 22, 1981

[30] Foreign Application Priority Data

Jun. 30, 1980 [FR] France .................. 80 14499

[51] Int. Cl.³ .............................. F02C 7/06
[52] U.S. Cl. .................. 60/39.08; 248/133; 248/580
[58] Field of Search ........ 60/39.08; 415/175; 280/5 R, 5 H, 7; 248/133, 141, 580, 596; 184/6.11

[56] References Cited

U.S. PATENT DOCUMENTS

| 1,806,516 | 5/1931 | Bardsley | 280/5 H |
|---|---|---|---|
| 2,090,059 | 8/1937 | McClane | 280/5 H |
| 2,481,547 | 9/1949 | Walker et al. | |
| 2,902,240 | 9/1959 | Belle | 280/5 H |

FOREIGN PATENT DOCUMENTS

| 2736127 | 2/1979 | Fed. Rep. of Germany . |
|---|---|---|
| 507163 | 9/1920 | France . |
| 80507 | 4/1963 | France . |
| 1318969 | 12/1963 | France . |
| 2201422 | 4/1974 | France . |
| 439255 | 12/1935 | United Kingdom . |
| 922122 | 3/1963 | United Kingdom . |
| 1224310 | 3/1971 | United Kingdom . |
| 1394320 | 5/1975 | United Kingdom . |

Primary Examiner—Louis J. Casaregola
Attorney, Agent, or Firm—Bacon & Thomas

[57] ABSTRACT

The reservoir has three fastening elements, on the upper part of the reservoir and the two others on the lower part of opposed end faces.

The fastening elements are provided at the ends of an axle mounted in elastic support means and in a tubular passage parallel to the adjacent face of the housing and parallel to the axis of the turbojet engine, secured to the reservoir and passing through it from end to end.

8 Claims, 5 Drawing Figures

RESERVOIR WITH AN ANTIVIBRATION SUSPENSION

BACKGROUND OF THE INVENTION

The invention concerns a reservoir with an antivibration suspension and more particularly an oil reservoir to be attached to the housing of a turbojet engine.

In turbojet engines, lubrication is assured by the circulation of oil, which also serves to remove some heat from the moving elements. The oil reserve must be sufficient to ensure the proper lubrication of the elements during the operation of the aircraft and it must be accessible when the aircraft is on the ground so that it may be filled.

When the oil reserve is independent on the equipment housing, it is designated an "oil reservoir" and is suspended from the engine housing. It is a thin structure, adapted to the environment of the engine annd the body of the aircraft. In addition to the specification relating to the function of the oil reservoir as the sorce of oil for the lubricating system, it must satisfy the requirements, among others, of useful life, weight and acceleration.

The life of the reservoir is determined to a great extent by the vibrations to which it is exposed, said vibrations generally causing weld failures in welded reservoirs, or fatigue cracking.

This problem does not appear to have had specific solutions heretofore. Thus, French Pat. No. 2,201,422 describes the fastening for an oil reservoir comprising a plurality of tubular supports passing through the reservoir from side to side and radially with respect to the housing to which it is to be fastened. These supports primarily effect the fastening of an aeration funnel provided in the reservoir. The passages in the tubular supports are used to bolt the reservoir to the housing. Further supporting fastening elements are attached to the reservoir by their ends only.

In such an arrangement, there are no means provided to protect the structure against stresses generated by the vibrations of the support on the one hand and by the sudden displacement of the weight of the oil inside the reservoir, on the other.

SUMMARY OF THE INVENTION

The reservoir according to the invention eleminates these disadvantages and has the configuration of a volume inscribed approximately in the frustum of a quadrangular prism comprising two relaively large opposing faces, one of them being arranged concentrically to the housing and in its vicinity, and the upper and lower faces having their longitudinal axes parallel to the axis of the turbojet engine, and three fastening elements, one of the elements being provided at the upper part of the reservoir and the two other elements on the lowr part of the faces laterally connecting the opposing faces, these two elements being placed on the ends of an axle cooperating by a plurality of elastic supporting means with a tubular passage parallel to the adjacent face of the housing and parallel to the axis of the turbojet engine, said tubular passage being fastened to the reservoir and passing through it from end to end.

It is seen that the elastic means, by effecting a flexible cooperation between the fastening means and the tubular passages traversing the reservoir from end to end, provide an effective protection against stresses potentially generated by the vibrations of the support.

According to another important characteristics of the invention, the reservoir carries at least one internal partition perpendicular to the large faces, to which it is fastened, said partition including in its lower part an orifice for the tubular passage.

The internal partitions, which play the role of stiffeners and a joint with the tubular passage, also act to effectively limit the volumes of oil being displaced during movements of the aircraft.

DESCRIPTION OF THE PREFERRED EMBODIMENTS

Figure 1:
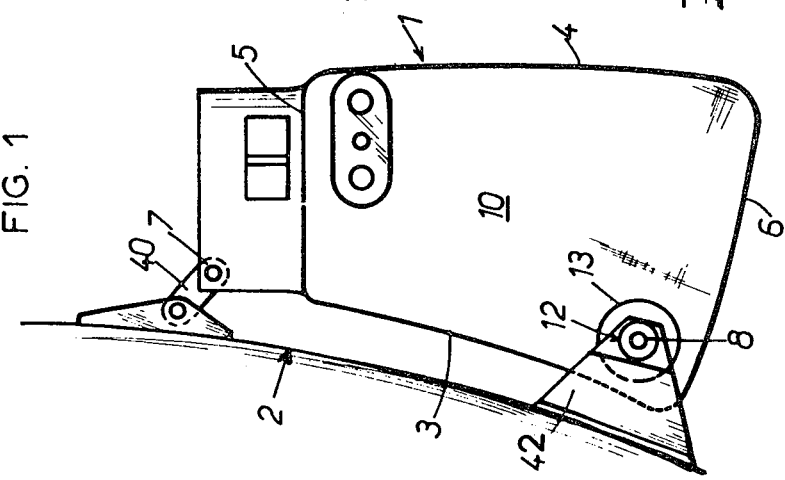
FIG. 1 shows, in end elevation, a reservoir embodying the present invention fastened to a turbojet engine.
Figure 2:
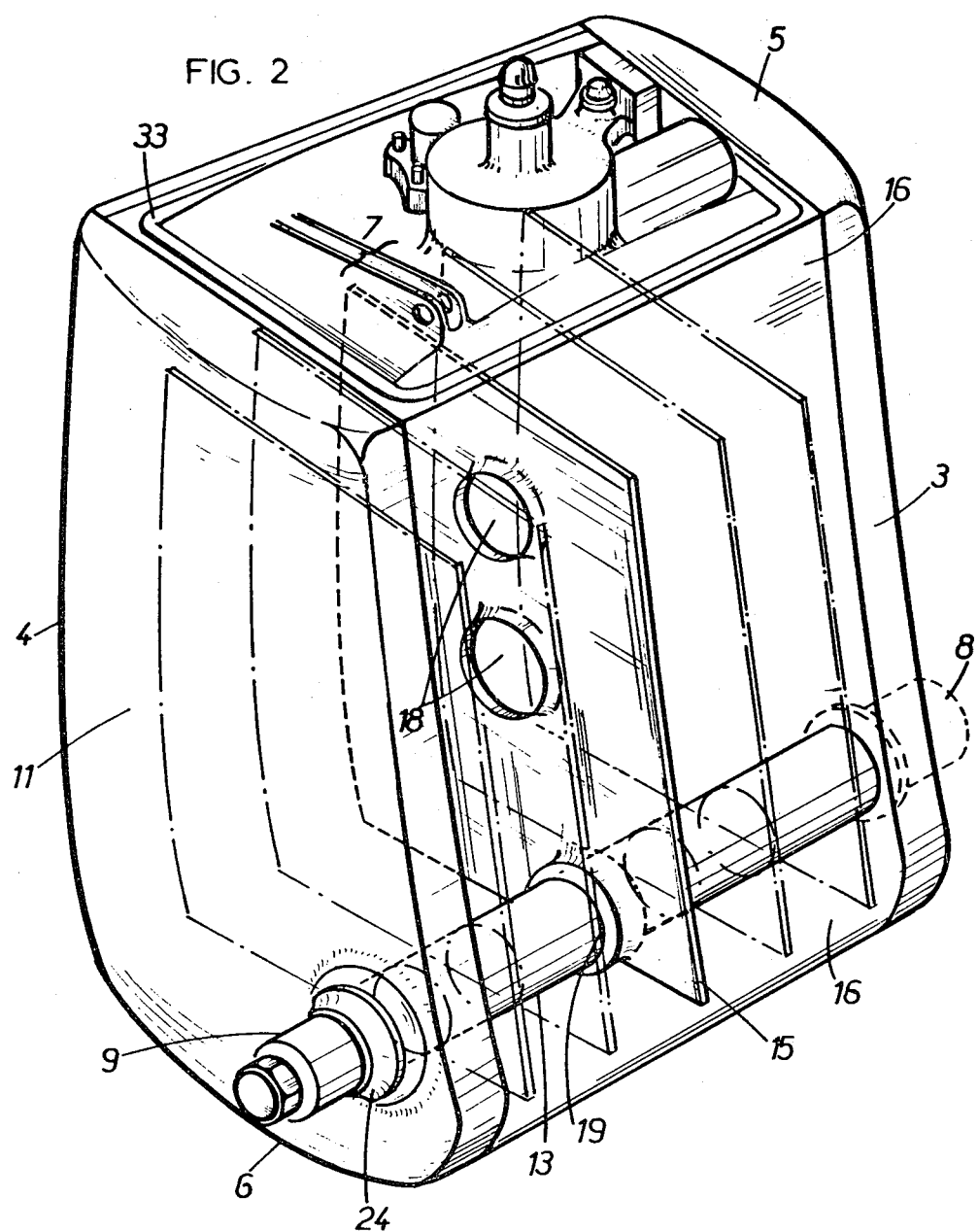
FIG. 2 is a perspective view, on the side of the turbojet engine, of an embodiment of a reservoir.

FIGS. 1 and 2 show an oil reservoir 1 to be fastened to the housing 2 of a turbojet engine. The reservoir is in the form of a volume inscribed approximately in a frustum of a quadrangular prism. The opposing faces 3 and 4 are relatively large with respyct to the others, and the face 3, adjacent to the housing 2, has a curved surface with a radius slightly larger than that of the housing and concentric with it. Face 4 also has a curvature playing the dual role of increasing the rigidity of the wall and to conform to the environment of the cell and the turbojet engine. The upper and lower faces 5 and 6 have their longitudinal axes parallel to the axis of the turbojet engine, which is perpendicular to the plane of FIG. 1.

The reservoir is attached to the housing 2 by means of three fastening elements. One of the elements 7 is provided on the upper part of the reservoir and the two others, 8 and 9, on the lower part of the end faces 10 and 11. The elements 8 and 9 are carried by the ends of an axle 12 which traverses the reservoir through a passage 13 formed by a tube, parallel to the face 3, adjacent to the housing 2, secured at least by its ends to the reservoir. The axle 12 is maintained in the passage by elastic support means.

Figure 3:
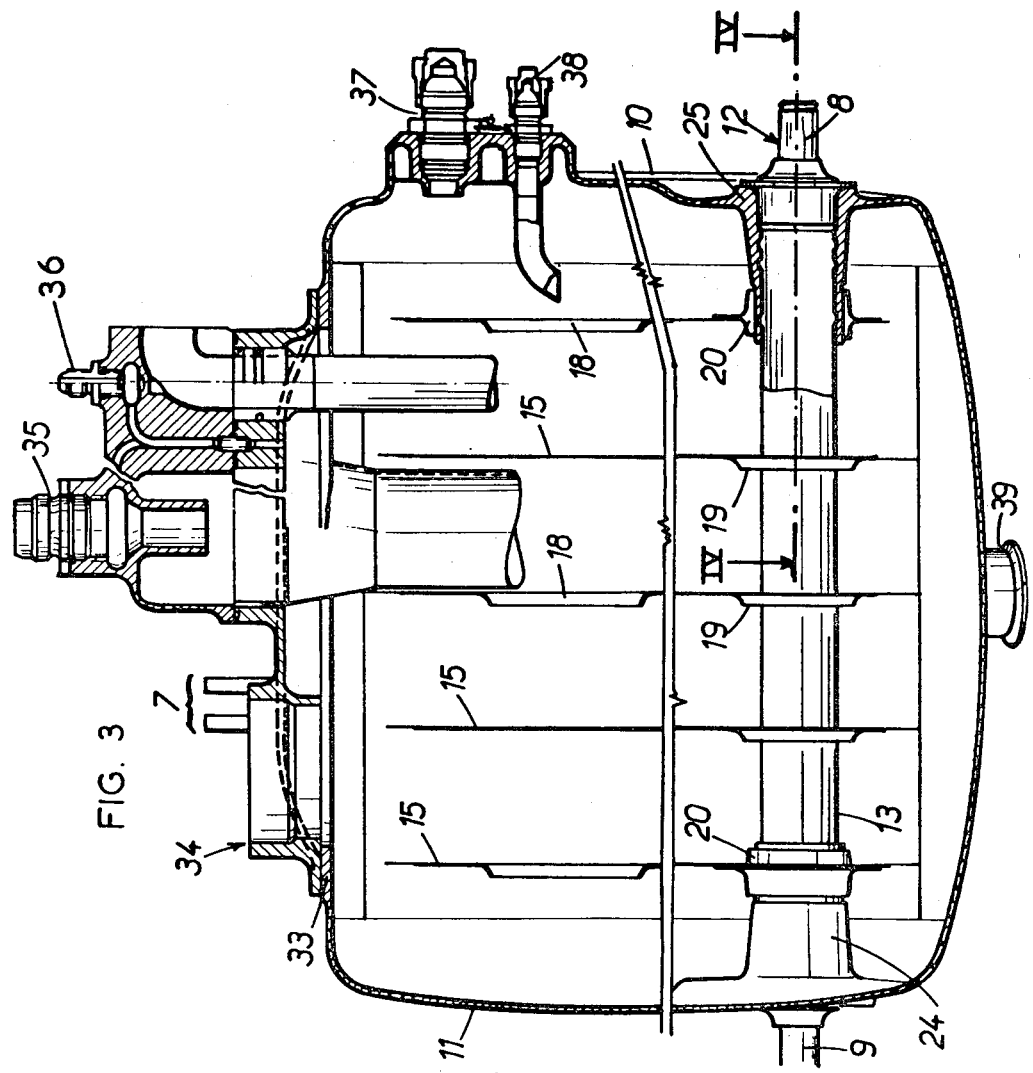
FIG. 3 is a sectional view of the reservoir of FIG. 2.

According to the embodiment of the reservoir shown in FIGS. 1 to 3, the envelope consists of elements made of a light alloy, for example, AG5 or 6061, assembled by means of end to end welding. The faces 3 and 4 of the reservoir are provided inside a plurality of ribs 14 (FIGS. 4 and 5), they are perpendicular to the sides and those on 3 face those on 4. Partitions 15 are secured to the end of the ribs, leaving the spaces 16 in the lower and the upper parts of the reservoir, making possible the balancing of the levels of oil in the chambers formed by the partitions. In order to reduce the weight of the assembly and to provide a better circulation of the oil, the partitions are penetrated by holes 18.

Each partition has in its lower part circular orifices 19 for the passage of the tube 13. At least one of the orifices is equipped with a flange 20, through which the tube 13 passes and to which it is fastened. According to the embodiment shown, the cylindrical bearing surface 21 has in its median part a groove 22, which cooperates with a circular projection 23 of the tube 13, formed, for example, by means of embossing or tube expansion, after assembly. The ends of the tube are secured tightly in two end flanges 24 and 25, which are also provided with similar grooves.

According to the embodiment shown, the reservoir is equipped with five, approximately equidistant partitions, with the orifices 19 of each of said orifices carrying a flange 20. The axle 12, the ends of which carry the fastening elements 8 and 9 for the reservoir consists (FIGS. 4 and 5) of an at least partially hollow cylindrical body, having thickened collars 26. The collars are spaced apart at distances corresponding to double the distance separating two partitions. Consequently, there are two intermediate collars between those provided at the ends of the axle. These collars receive elastic sleeves 27 of a length approximately equal to that of the flanges 20, said sleeves being maintained in place by tubular spacers 28, each carrying at its end a circular stop 29.

The elastic sleeves cooperating with the end flanges 24 and 25, about inwardly against the stops 29 of the spacers and outwardly against a pressure element, for example, a washer, activated by a screw 31 cooperating with threading provided on the surface of the axle, with the assembly of the pressure element and the screw constituting means for axial displacement.

Figure 4:
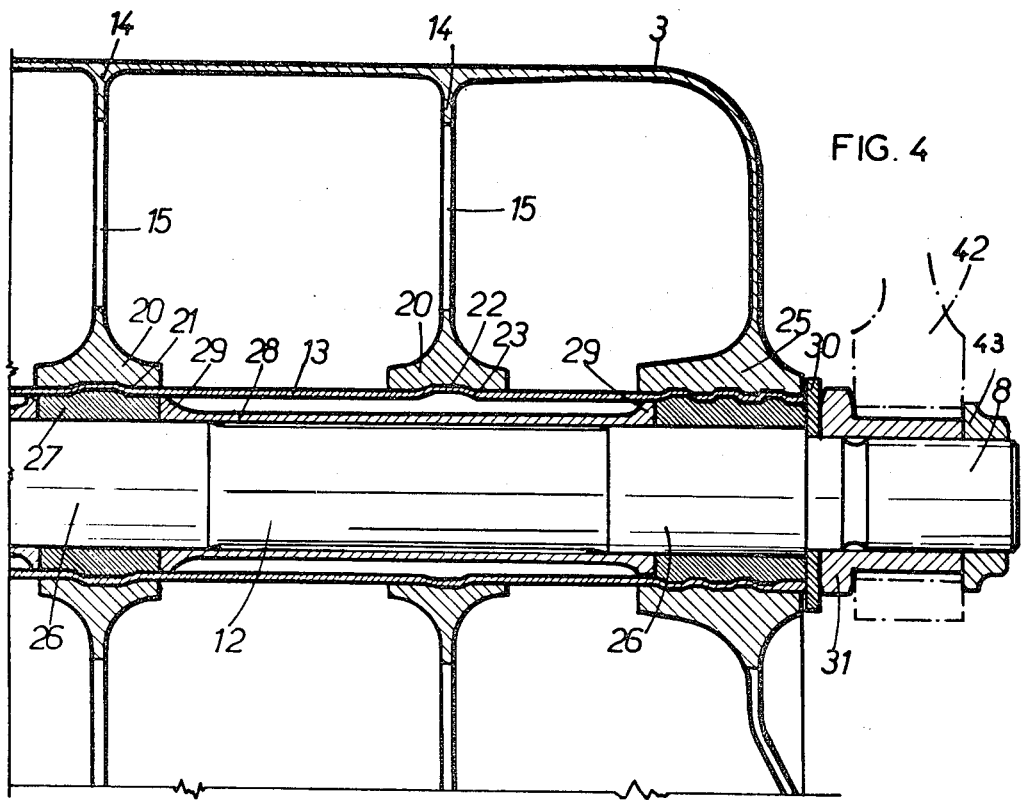
FIG. 4 is a partial cross sectional view on the line IV—IV of FIG. 3, on the larger scale, showing a first embodiment of the elastic support means.
Figure 5:
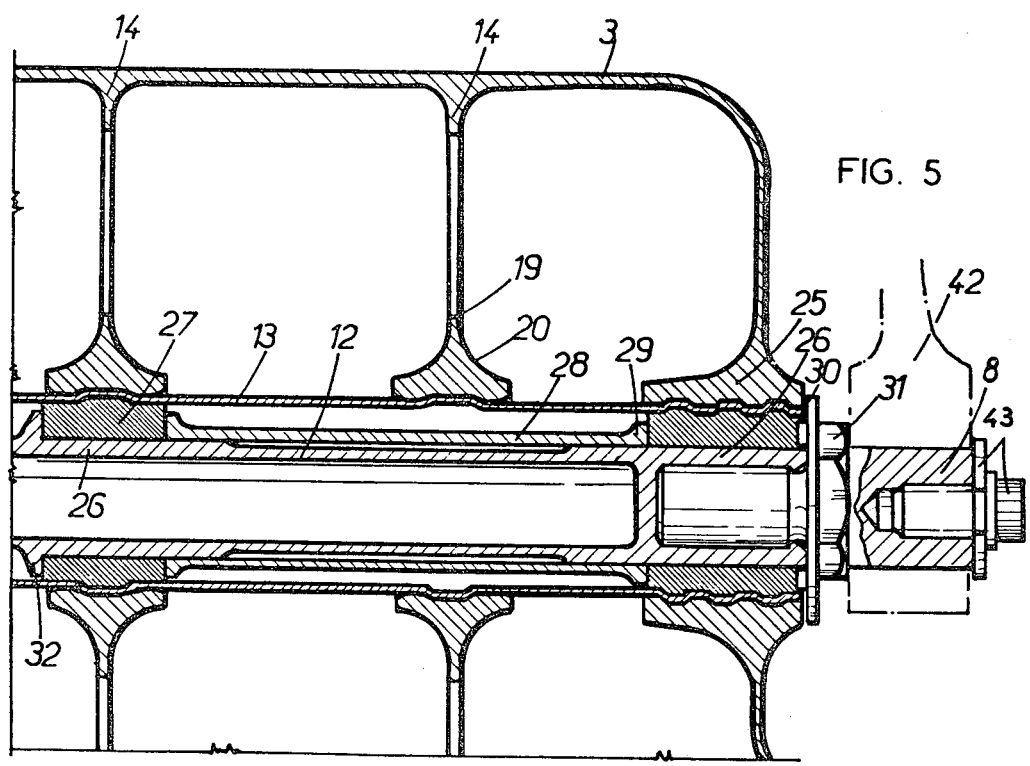
FIG. 5 is a partial cross sectional view on the IV—IV of FIG. 3 on a larger scale showing a second embodiment of the elastic support means.

In the embodiment shown in FIG. 4, the elastic sleeves are separated from each other by the spacers 28, in that represented in FIG. 5, the inner sleeve abuts against a circular stop 32, formed during machining of the collars 26, or may be applied and secured by any suitable known means.

The axle 12 is maintained in the tube 13 by tightening the screws 31 which act on the washers 30, which in turn apply pressure directly or indirectly (by means of the spacers) to the elastic sleeves and against the wall of the tube 13, the diameter of said sleeves being increased. By placing the elastic sleeves in the same plane as the flanges, the risk of the deformation of the tube 13 is eliminated.

The fastening elements 8, 9 to secure the reservoir to the turbojet engine are provided to cooperate with the straps 42 and 41 attached directly or indirectly to the housing. They consist of two wrist pins supported in the straps. A point of attachment is established and one of the wrist pins is supported by the tightening elements 43, consisting in a known manner, for example, of a lock nut or a lock washer and a bolt, while the other has sufficient clearance to accommodate expansions.

FIGS. 2 and 3 show an embodiment of a reservior, wherein the upper face 5 has an approximately rectangular orifice 33, the edge of which forms a support surface. The orifice is closed by a cover 34, carrying an aeration fitting 35, an antisiphon device 36, an oil gauge, etc...., together with the strap 7 constituting the upper fastening element.

Further accessory elements are placed at different locations on the reservoir. On the face 19, there are found the overflow pipe 37 and the remote filler device 38. On the lower face 6, the drain plug 39 is located.

In the embodiment of the reservoir, the strap 7 (upper fastening point) receives a swivel joint 40 (FIG. 1, the wrist pin 8 is maintained fixedly in the strap fastened to the housing and the wrist pin 9 has sufficient clearance in the strap 41 (not shown) to allow for free expansion.

I claim:

1. An oil reservoir with an antivibration suspension to be fastened to the housing of a turbojet engine, characterized in that the reservoir is in the form of a volume inscribed approximately in the frustum of a quadrangular prism having two large opposing faces (3, 4), one of which (3) is located concentrically to the housing and in its vicinity, and interconnected by means of end faces (10, 11) and upper (5) and lower (6) faces parallel to the axis of the turbojet engine, said reservoir having a fastening element (7) at the upper part of the reservoir and two fastening elements (8, 9) on the lower part of the end faces (10, 11) carried by the ends of an axle (12) which extends parallel to the axis of the turbojet engine, passing through the reservoir from end to and mounted in elastic support means within a tubular passage (13) which also extends through the reservoir, said elastic support means consisting of at least two sleeves (27) of an elastic material, surrounding the axle (12) and being maintained spaced apart by means of a tubular spacer (28) on the axle (12) which spacers has circular stops (29), abutting against end surfaces of the sleeves (27), and means for the axial displacement (30, 31) of the sleeves and the spacer being provided at one end of the axle (12).

2. An oil reservoir according to claim 1 wherein the end faces (10, 11) have cylindrical flanges (25, 24) through which pass and to which are secured the ends of the tubular passage (13).

3. An oil reservoir according to claim 1 wherein it contains at least one internal partition (15) perpendicular to the large opposing faces (3, 4), secured to the ribs (14) carried by the internal walls of the large opposing faces (3, 4) in a plane perpendicular to the faces (3, 4), said partition containing its lower part an orifice (19) equipped with a cylindrical flange (20) through which passes and to which is secured the tubular passage (13).

4. An oil reservoir according to claim 2 or claim 3 wherein the elastic sleeves (27) are of a length approximately equal to that of the cylindrical flange and are positioned in the tubular passage (13).

5. An oil reservoir according to claim 1 wherein the axle (12) has at least one collar (32) forming the circular stop for one of the terminal surfaces of an elastic sleeve.

6. An oil reservoir according to claim 3 wherein internal partitions (15) forms, in relation to the upper (5) and lower (6) surfaces, the free spaces allowing the balancing of the oil levels and the partitions having a plurality of holes (18) for the circulation of the oil.

7. An oil reservoir according to claim 1 wherein the upper face (5) of the reservoir contains an orifice providing for the inspection of welds and for cleaning and the border of which defines a flat support surface (3) to receive a cover (34).

8. An oil reservoir according to claim 1 wherein the fastening element (7) provided on the upper part of the reservoir consists of a strap secured to the reservoir and receiving an axle cooperating with one end of a link (40), the other end whereof cooperates with a strap fastening to the housing of the engine and in that the fastening elements (8, 9) located on the lower part of the reservoir cooperate with straps (42, 41) secured to the housing of the engine.

* * * * *